United States Patent [19]

Mauer et al.

[11] Patent Number: 4,846,946

[45] Date of Patent: Jul. 11, 1989

[54] PROCESS FOR REDUCING ATTENDANT COLOR SHIFT IN COATINGS CONTAINING BLOCKED ISOCYANATES

[75] Inventors: George W. Mauer, Allison Park; Gregory J. McCollum, Gibsonia; Peter Kamarchik, Jr., Saxonburg, all of Pa.

[73] Assignee: PPG Industries, Inc., Pittsburgh, Pa.

[21] Appl. No.: 131,888

[22] Filed: Dec. 11, 1987

[51] Int. Cl.$^4$ .................. C25D 13/00; C25D 13/06
[52] U.S. Cl. ............................. 204/181.4; 204/181.6; 204/181.7; 427/385.5; 427/407.1; 502/167
[58] Field of Search .................. 427/340, 342, 385.5, 427/407.1; 502/167; 528/45, 59, 76, 77, 85; 204/181.4, 181.6, 181.7

[56] References Cited

U.S. PATENT DOCUMENTS

| | | | |
|---|---|---|---|
| 4,031,050 | 6/1977 | Jerabek | 204/181 X |
| 4,182,833 | 1/1980 | Hicks | 528/120 |
| 4,284,572 | 8/1981 | Stanley et al. | 260/347.4 |
| 4,433,017 | 2/1984 | Goto et al. | 528/45 |
| 4,698,141 | 10/1987 | Anderson et al. | 525/510 X |
| 4,698,398 | 10/1987 | Kordemenos et al. | 525/437 |

*Primary Examiner*—Michael Lusignan
*Attorney, Agent, or Firm*—Godfried R. Akorli

[57] ABSTRACT

Disclosed herein is a process for reducing color shift in coating compositions containing blocked isocyanates, which are prepared by reacting meta-xylylene diisocyanate with a select group of ketoximes.

9 Claims, No Drawings

PROCESS FOR REDUCING ATTENDANT COLOR SHIFT IN COATINGS CONTAINING BLOCKED ISOCYANATES

BACKGROUND OF THE INVENTION

1. Field of the Invention

The present invention relates to a process for reducing attendant color shift in coatings containing blocked isocyanates. More specifically, the present invention relates to reduction in yellowing of the coatings and its effect on topcoats.

2. Brief Description of the Prior Art

Curable compositions containing blocked isocyanate crosslinking agents are known in the art. In instances of aromatic-containing blocked isocyanates, one can encounter an associated problem of yellowing topcoats or the like which are in contact therewith. Yet, another associated problem with aromatic-containing blocked isocyanates is the yellowing of topcoats or the like, in contact therewith. In many instances the above-associated problems are solved at the expense of other desirable coating properties such as stability, throw power, film build, cure temperature, and corrosion resistance.

Hence, work in this area has continued in developing blocked isocyanate curing agents which would avoid the associated problems without compromising other desirable coating properties. The work done has shown that proper selection of isocyanates and blocking agents for the isocyanate groups is determinative of the performance of the curable compositions containing the same.

One is, therefore, faced with a myriad of combinations of isocyanate and blocking agents that would produce the appropriate blocked isocyanates which would overcome the afore-stated problems. By the present invention, a specific combination of an isocyanate and blocking agent has been found effective in overcoming the afore-stated problems.

To be sure, in the art of preparing blocked isocyanates, there has been disclosed enumerable isocyanates which are said to be reactable with enumerable active hydrogen containing materials. There is, however, no basis in the prior art for selecting a specific isocyanate and a blocking agent in accordance with this invention, in order to obtain the remarkable combination of coating properties described hereinbelow.

SUMMARY OF THE INVENTION

In accordance with the foregoing, the present invention encompasses a process for reducing or preventing color shift (yellowing) in coating compositions containing blocked isocyanates. The process is characterized by other coating properties of stability, good throw power, and good film build. In addition properties such as good corrosion resistance typical of aromatic isocyanates is obtained together with the reduced chalking and non-yellowing characteristics typical of aliphatic isocyanates. This combination of properties is unexpected and appears to be unique to this select group of curing agents.

The claimed invention is a process for reducing color shift comprising: (1) applying to a substrate a curable coating composition comprising an active hydrogen-containing material and a curing agent which is a reaction product of meta-xylylene diisocyanate or a prepolymer thereof and a ketoxime containing from three to five carbon atoms; and (2) heating the applied coating to a temperature sufficient to effect cure.

The term "color shift", as used herein, describes "yellowing" of coatings containing blocked isocyanates, or the effect of such yellowing on clear, or colored coatings particularly those of light or pastel colors in contact therewith. In the instance of powder topcoats, the color shift is more of a concern because the relatively higher temperatures at which these coatings are baked to cure. By the present invention, the color shift is reduced or completely eliminated.

DETAILED DESCRIPTION OF THE INVENTION

The novel blocked isocyanate curing agent can be prepared by reacting meta-xylylene diisocyanate or a prepolymer thereof with a low molecular weight ketoxime, containing from about three to five carbon atoms. In the present embodiment of the invention, methylethyl ketoxime blocked meta-xylylene diisocyanate is preferred in that the resulting coating possesses the afore-stated properties as well as good appearance properties.

In preparing the novel blocked isocyanate, the ketoxime and the meta-xylylene diisocyanate or a prepolymer thereof are admixed under anhydrous or substantially anhydrous conditions and generally in an inert atmosphere such as under a nitrogen blanket. The prepolymer can be derived from a polyol such as trimethylolpropane, trimethylol ethane, polycaprolactone triol and the like. The equivalent ratio of the —OH of the ketoxime to the —NCO of the isocyanate can be from about 0.3 to 1.0:1, typically about 0.5 to 1:1. The remaining —NCO groups can then be reacted with other active hydrogen compounds in order to achieve the desired properties. In the present embodiment, trimethylolpropane (TMP) is preferred.

The starting materials may be added simultaneously to the reaction vessel, or they may be added slowly, one to the other. After all the ingredients have been added, the mixture is reacted (with stirring) until all, or virtually all, of the isocyanate is reacted. The reaction is carried out at about 25° C. to 100° C. for about 1 to 12 hours, preferably, 35° C. to 80° C. for about 4 to 10 hours. The degree of conversion of the reactants to the urethanes can be determined by infrared spectroscopy or —NCO titration. It may, in some instances, be necessary to employ other reactants, such as alcohols, to consume unreacted isocyanates remaining in the resultant mixture.

A catalyst is usually employed in preparing the novel blocked isocyanates. Catalysts, useful herein, are those suitable for urethane formation. Preferably, metals, metal salts or complexes, for example, lead acetate, dibutyltin dilaurate, stannous octoate and the like are employed.

A solvent is usually employed in preparing the novel blocked isocyanates. Solvents that are non-reactive with isocyanates are usually preferred, e.g., ketones, e.g., methylisobutyl ketone, ethers such as diethyl ether of ethylene glycols, or esters such as ethyl acetate, and other solvents such as dimethylformamide, dimethylsulfoxide or N-methyl-1-pyrrolidone. In a case where no solvent is used during the preparation of the urethane, almost any solvent can be post-added to thin the product.

While the above-method of preparing the novel blocked isocyanates is described herein with particularity, other methods of preparation can be employed. Thus, compounds or compositions obtained by other methods, having structural formulas and properties as the novel blocked isocyanates described herein, are encompassed by this invention.

In the practice of the invention, the novel blocked isocyanates are useful in combination with active hydrogen-containing materials to form curable compositions such as coating compositions. In the preferred low temperature cure embodiments of the invention, the novel blocked isocyanate is employed with cure catalysts which are more fully defined herein. The active hydrogen group can be hydroxy, primary or secondary amino or thio group. Non-limiting examples of the active hydrogen-containing materials are hydroxyl group-containing polymers, e.g., polymeric polyols, such as alkyd polymers, polyester polymers, hydroxyl group-containing acrylic polymers, hydroxyl group-containing polyurethane polymers, hydroxyl group-containing polyurea polymers, hydroxyl group-containing polyether polymers, hydroxyl group-containing polymers which are polyepoxide-amine adducts. The epoxy-derived polymers can be epoxy-free or epoxy-containing. Combinations of the above-mentioned polymers can also be used.

The molecular weights of the polymeric polyols can vary over a wide range depending upon their type and on whether the curable composition is organic solvent-based or water-based and also on the desired Performance characteristics of the coating. Polyester, epoxy, and alkyd polymers can have molecular weights as low as about 500 and as high as about 50,000, preferably the molecular weights are usually in the range of about 1,000 to 5,000; the molecular weights being on a number average basis relative to polystyrene, as determined by gel permeation chromatography. Acrylic polymers prepared by solution polymerization can have molecular weights of about 100,000 or higher, and usually in the range of about 5,000 to 50,000 on a number average basis relative to polystyrene, as can be determined by gel permeation chromatography. For acrylic latices, the molecular weight can range from 100,000 to several millions.

The hydroxyl content of the polymeric polyol should be such that when the polyol is in combination with the curing agent, the composition will cure to a solvent-resistant coating. Generally, the hydroxyl number of the polymeric polyol will be at least about 50 and preferably will be in the range of about 100 to 300, based on the resin solids.

A preferred class of polymeric polyols are hydroxyl group containing epoxy polymers. A particularly preferred class of polymeric polyols are the polyepoxide-amine adducts. The epoxy polymers which can be used in the practice of the invention are polyepoxides, that is, polymers having a 1,2-epoxy equivalency greater than 1, preferably about 2 or more. Preferred are polyepoxides which are difunctional with regard to epoxy. The preferred polyepoxides are polyglycidyl ethers of cyclic polyols. Particularly preferred are polyglycidyl ethers of polyphenols such as bisphenol A. Examples of polyepoxides are given in U.S. Pat. No. 4,260,716, column 3, line 20 to column 4, line 30, the portions of which are hereby incorporated by reference.

Besides the epoxy polymers disclosed above, other epoxy-containing polymers which can be used are acrylic polymers which contain epoxy groups. These polymers are formed by polymerizing an unsaturated epoxy group-containing monomer such as glycidyl acrylate or methacrylate with one or more other polymerizable ethylenically unsaturated monomers. Examples of these polymers are described in U.S. Pat. No. 4,001,156, column 3, line 59 to column 5, line 60, the portions of which are hereby incorporated by reference.

Examples of amines which can be used in preparing the polyepoxide-amine adduct are ammonia, primary, secondary, and tertiary amines and mixtures thereof. The reaction product of the polyepoxide and the amine can be at least partially neutralized with an acid to form a polymeric product containing amine salt and/or quaternary ammonium salt groups. Reaction conditions of polyepoxides with amines, examples of various amines and at least partial neutralization with acid are disclosed in U.S. Pat. No. 4,260,720, column 5, line 20 to column 7, line 4, the portions of which are hereby incorporated by reference. Also, various polyepoxide-amine adducts are described in European Patent Application No. 0012463.

With regard to the amount of organic amine and polyepoxide which are reacted with one another, the relative amounts depend upon the extent of cationic base such as cationic salt group formation desired and this in turn will depend upon the molecular weight of the polymer. The extent of cationic salt group formation and the molecular weight of the reaction product should be selected such that when the resultant cationic polymer is mixed with aqueous medium, a stable dispersion will form. A stable dispersion is one which does not settle or is one which is easily dispersible if some sedimentation occurs. In some embodiments, the dispersion should additionally be of sufficient cationic character that the dispersed polymer particles will migrate towards the cathode when an electrical potential is impressed between an anode and a cathode immersed in aqueous dispersion.

Also, the molecular weight, structure, and extent of cationic salt group formation should be controlled such that the dispersed polymer will have the required flow to form a film on the substrate; in the case of electrodeposition, to form a film on the cathode. The film should be insensitive to moisture to the extent that it will not redissolve in the electrode position bath or be rinsed away from the coated surface after removal from the bath.

In general, most of the cationic polymers useful in the practice of the invention will have average molecular weights within the range of about 500 to 100,000 and contain from about 0.01 to 5.0, preferably from about 0.3 to 3.0 milliequivalents of basic group, e.g., cationic group, per gram of resin solids. Obviously, one must use the skill in the art to couple the molecular weight with the cationic group content to arrive at a satisfactory polymer. The polyglycidyl ethers will have molecular weights of about 500 to 10,000, preferably 1,000 to 5,000. Acrylic polymers, on the other hand, will have molecular weights as high as 100,000, preferably 5,000 to 50,000.

Besides the cationic polymers, anionic polymers which are designed to form aqueous-based coating compositions may be used in coating applications such as electrodeposition. It should also be appreciated that organic solvent-based coating compositions employing the above polymers without ionic salt groups can also be used. Formulating coating compositions with such polymers is well known in the art and need not be described in any further detail.

The novel blocked isocyanates can be a separate or integral component to the active hydrogen-containing material. For example, meta-xylylene diisocyanate can be fully blocked with the ketoximes of this invention and be present as a separate component with the active hydrogen-containing material. Alternatively, meta-xylylene diisocyanate can be partially blocked with the ketoximes of this invention and reacted with the active hydrogen-containing material to form an ungelled one-component material. In the latter case, the resultant urethane is integral with the active hydrogen-containing material rather than being present as a separate component. Procedures for preparing integral blocked isocyanate curing agents as shown in U.S. Pat. No. 3,947,338. Whether present as a separate component or integral with the active hydrogen-containing material, the novel blocked isocyanates are present in amounts sufficient to impart excellent cure to the curable composition. Typically, the blocked isocyanate is present in an equivalent ratio of about 0.30 to 1:1 and preferably 0.5 to 1:1 of the blocked isocyanate to the active hydrogen-containing material of the curable composition.

The novel blocked isocyanates are usually employed in combination with a cure catalyst. Typically, the cure catalyst is a metal salt and/or complex of a metal such as lead, zinc, iron, tin, and manganese. Suitable salts of these metals are, for example, octoates and naphthenates. A suitable complex is, for example, acetyl acetonate. The cure catalyst is used in amounts sufficient to effect cure at the relatively low temperatures described herein. For example, the metal salt and/or complex is employed as a cure catalyst in amounts of about 0.1 to 2.0, preferably 0.2 to 1 percent metal by weight (solids) based on the weight of the curable composition. The cure catalyst can be mixed simultaneously with other starting materials for the preparation of the coating composition or introduced into the coating composition in any order that is convenient.

In the practice of the invention, the curable compositions can be used as coating, laminating, or molding compositions. In the practice of the invention, as coating compositions, particularly water-based coating compositions, the components of the coating composition can be mixed simultaneously or in any order that will provide an effective dispersion. The term "dispersion", as used herein, denotes solutions and colloidal suspensions as well. If the components are a liquid and of sufficiently low viscosity, they can be mixed together neat to form the coating composition. Alternately, if the components are higher viscosity liquids or solids, the components can be mixed with a diluent to reduce the viscosity of the composition so that it may be suitable for coating applications.

By "liquid diluent" is meant a solvent or a non-solvent which is volatile and which is removed after the coating is applied and is needed to reduce viscosity sufficiently to enable forces available in simple coating techniques, that is, brushing and spraying, to spread the coating to controllable, desired and uniform thickness. Also, diluents assist in substrate wetting, resinous component compatibility, and coalescence of film formation. Generally, when used, the diluent will be present in the composition in amounts of about 20 to 90, preferably 50 to 80 percent by weight based on total weight of the coating composition, although more diluents may be employed depending upon the particular coating application.

Examples of suitable liquid diluents for organic solvent-based coatings will depend somewhat on the particular system employed. In general, however, aromatic hydrocarbons, such as toluene and xylene; ketones, such as methyl ethyl ketone and methylisobutyl ketone; alcohols, such as isopropyl alcohol, normal butyl alcohol; monoalkyl ethers of glycols such as 2-alkoxyethanol, 2-alkoxypropanol, and compatible mixtures of these solvents can be used.

Besides organic solvents, water can be used as a diluent either alone or in combination with water-miscible organic solvents. When water is used, the coating composition is usually modified such as by incorporating water-solubilizing groups such as the cationic groups mentioned above to provide for the necessary solubility in water. Besides the cationic groups mentioned above, other water-solubilizing groups such as non-ionic groups, for example, ethylene oxide groups, and anionic groups such as carboxylate salt groups may be introduced into the polymer to disperse or solubilize the coating composition in water.

The coating compositions of the invention may also optionally contain a pigment. Pigments may be of any conventional type comprising, for example, iron oxides, lead oxides, strontium chromate, carbon black, coal dust, titanium dioxide, talc, barium sulfate, as well as color pigments such as cadmium yellow, cadmium red, chromium yellow and metallic pigments such as aluminum flake.

The pigment content of the coating composition is usually expressed as the pigment-to-resin weight ratio. In the practice of the present invention, pigment-to-resin weight ratios can be 2:1 or higher, and for most pigmented coatings, are usually within the range of about 0.05 to 1:1.

In addition to the above ingredients, various fillers, plasticizers, anti-oxidants, ultraviolet light absorbers, flow control agents, surfactants and other formulating additives can be employed if desired. These materials are optional and generally constitute up to 30 percent by weight of the coating composition based on total solids.

The coating compositions of the invention can be applied by conventional methods, e.g., non-electrophoretic methods including brushing, dipping, flow coating and spraying. Usually, they can be applied virtually over any substrate including wood, metal, glass, cloth, leather, plastic, foam and the like, as well as over various primers. For electroconductive substrates such as metals, the coatings can be applied by electrode position. In general, the coating thickness will vary somewhat depending upon the application desired. In general, coatings from about 0.1 to 10 mils can be applied and coatings from about 0.1 to 5 mils are usual.

When an aqueous dispersion of the coating composition is employed for use in electrode position, it is placed in contact with an electrically conductive anode and an electrically conductive cathode. The surface to be coated can be made the cathode or the anode. In the case of cationic electrode position, which is preferred herein, the surface to be coated is the cathode. Following contact with the aqueous dispersion, an adherent film of the coating composition is deposited on the electrode being coated when a sufficient voltage is impressed between the electrodes. Conditions under which electrode position is carried out are known in sufficient voltage is impressed between the electrodes. Conditions under which electrode position is carried out are known in the art. The applied voltage may be varied and can be, for example, as low as one volt or as high as several thousand volts, but is typically between 50 and 500 volts. Current density is usually between 1.0 ampere and 15 amperes per square foot and tends to decrease during electrode position indicating the formation of an insulating film.

The electrocoating composition of this invention is usually characterized by high throw power, often as high as about 11 to 13 inches, and excellent film build in the range of about 1 mil. Considering that the performance properties of the resultant electrocoats do not suffer, the above characteristics are remarkable.

After the coating has been applied, it is cured by heating at elevated temperatures for a period of time sufficient to form solvent-resistant coatings. By "solvent-resistant coatings" is meant that the coating will be resistant to acetone, for example, by rubbing across the coating with an acetone-saturated cloth. Coatings which are not cured or poorly cured will not withstand the rubbing action with acetone and will be removed with less than 10 acetone double rubs. Cured coatings, on the other hand, will withstand a minimum of 20 acetone double rubs, and preferably 100 acetone double rubs.

It has been found that substrates coated with compositions employing the novel blocked isocyanates can cure at relatively lower temperatures. In certain embodiments of the invention, it has been found that the blocked isocyanates impart excellent cure as measured by solvent resistance at temperatures as low as 120° C. for about 20 to 30 minutes. It is a unique feature of this invention that in comparison with conventional curing agents, particularly those which comprise blocked aliphatic isocyanate curing agents, which give similar reduced chalking and non-yellowing characteristics, these urethanes impart a higher degree of cure at ordinary cure temperatures (170° C.) and at relatively lower temperatures. It is a distinct feature of the invention that the novel blocked isocyanates are stable in coating compositions, particularly water-based coating compositions, and provide low temperature cure as described herein. It is, furthermore, a distinct advantage that the cure coatings have excellent corrosion resistance and appearance.

It has also been found that when the coatings of this invention are top-coated with the likes of lacquers, powder coatings, or color plus clear coatings, the resultant multiple coatings are characterized by the properties of non-yellowing. The topcoat can be applied by any convenient means, such as spraying, and then cured by drying or baking and evaluated as described herein. The topcoats can be any of the art-known coating that are compatible with the coating containing the novel blocked isocyanates. Illustratively, the following coatings which are available from PPG Industries, Inc., can be used as the topcoats. They can be: powder coatings derived from epoxy-functional acrylic polymers (about 77 parts by weight) and polyol-modified polyanhydride curing agent such as is disclosed in U.S Pat. Ser. No. 74,105, filed July 16, 1987; lacquers comprising nonaqueous dispersions of high molecular weight acrylic polymer, available as WALD 3967; color plus clear coating wherein the base coat is a high solids coating comprising a polyester polyol - polyurethane polyol - melamine system available as UBC 8554; and the clear coat is a high solids acrylic polymer - polyester polyol - melamine resin system available as DCT 3000. Other color plus clear systems, useful herein, can be "NCT" coatings (available from PPG Industries, Inc.) comprising epoxy-functional acrylic resins curable with half esters of anhydrides as is disclosed in U.S. Pat. No. 4,650,718. By the use of the novel blocked isocyanate curing agents, yellowing is substantially or completely eliminated from multiple coatings wherein the topcoat is a clear coating or colored coating, particularly those which are of pastel colors.

These and other properties of the invention are further illustrated by the following non-limiting examples.

EXAMPLES

The following examples illustrate the novel blocked isocyanate curing agents and methods of making and using the same in coating compositions.

Example 1A

A crosslinkable resinous composition (active hydrogen containing) was prepared as follows:

| Ingredients | Parts by Weight (grams) |
|---|---|
| EPON 828[1] | 1910 |
| Bisphenol A-ethylene oxide adduct (1/6 molar ratio) | 664 |
| Methylisobutyl ketone | 164 |
| Bisphenol A | 554 |
| Benzyldimethylamine | 2.68 |
| Benzyldimethylamine | 6.00 |
| Diketimine[2] | 213 |
| N—methylethanolamine | 183 |
| DOWANOL PPH[3] | 34.4 |

[1]Epoxy resin solution made from reacting epichlorohydrin and bisphenol A having an epoxy equivalent of about 188, commercially available from Shell Chemical Company.
[2]Diketimine derived from diethylenetriamine and methylisobutyl ketone (73% solids in methylisobutyl ketone).
[3]Phenoxy-2-propanol from Dow Chemical Company.

The EPON 828, bisphenol A-ethylene oxide adduct, bisphenol A and methylisobutyl ketone were charged to a reaction vessel and heated together under a nitrogen atmosphere to 140° C. The first portion of benzyldimethylamine was added and the reaction mixture was heated with a resulting exotherm to 180° C. and refluxed under reduced pressure to remove azeotropically any water present. The reaction mixture was cooled to 160° C., held for ½ hour, cooled further to 137° C., and the second portion of benzyldimethylamine added. The reaction mixture was held at 137° C. for two hours at which time a reduced Gardner-Holdt viscosity (50 percent resin solids in methoxypropanol) of R was obtained. The diketimine derivative and methylethanolamine were added and the temperature of the reaction mixture was brought to 125° C. and held at this temperature for about one hour. The DOWANOL PPH was added and mixed.

Example 1B

This example illustrates the novel blocked isocyanate curing agent of the present invention.

| Ingredients | Parts by Weight (grams) |
|---|---|
| Meta-xylylene diisocyanate (MDXI) | 3760 |
| Methylisobutyl ketone | 2540 |
| Methylethyl ketoxime | 1740 |
| Methylisobutyl ketone | 200 |

-continued

| Ingredients | Parts by Weight (grams) |
|---|---|
| Dibutyltin dilaurate | 3.65 |
| Trimethylolpropane | 892.5 |

The meta-xylylene diisocyanate and 2540 grams of methylisobutyl ketone were charged to a reactor vessel equipped with a condenser and the contents were then warmed to 28° C. The methylethyl ketoxime was added to the mixture over a period of three hours while applying cooling to keep the reaction mixture at 54° C. or lower. The 200 grams of methylisobutyl ketone was then employed as a rinse. The reaction mixture was held for about 30 minutes at 45° C. Thereafter, the trimethylolpropane was added in three equal batches as follows. At 43° C., batch-one was added with a resulting exotherm and the reaction temperature was maintained with cooling at 40° C. The reaction mixture was held for 30 minutes at 40° C. At 40° C., batch-two was added with a resulting exotherm and the reaction temperature being maintained with cooling at 47° C. After batch-three of trimethylolpropane, the reaction exothermed to 58° C. The dibutyltin dilaurate was then added and the reaction exothermed to 92° C. The reaction was held at above 60° C. but below 100° C. until infrared spectrometric analysis revealed no more isocyanate groups were left. The resin viscosity was about Z-2 to Z-3.

Example 1C

An aqueous dispersion of the resinous composition and the crosslinker were prepared as follows:

| Ingredients | Parts by Weight (grams) |
|---|---|
| Resin (same as in 1A) | 825 |
| Lactic acid | 61 |
| Surfactant[1] | 21 |
| Crosslinker (same as in 1B) | 794 |
| Deionized water | 706 |
| Deionized water | 534 |
| Deionized water | 841 |

[1]Cationic surfactant prepared by blending 120 parts of alkyl imidazoline commercially available from Geigy Industrial Chemicals GEIGY AMINE C, 120 parts by weight of an acetylenic alcohol commercially available from Air Products and Chemicals Inc. as SURFYNOL 104, 120 parts by weight of 2-butoxyethanol and 221 parts by weight of deionized water and 19 parts of glacial acetic acid.

A resin essentially the same as described in Example 1A was added to a mixture of lactic acid, the surfactant, the crosslinker and 706 grams of water and blended. The resultant dispersion having a solids content of 55 percent was reduced in solids content to 45 and 35 percent solids by addition of the remaining parts by weight of water. The resultant aqueous dispersion was then vacuum stripped of solvent to yield a dispersion of 38.2 percent solids.

Example 1D

A cationic paint was formulated with the above aqueous dispersion as follows.

| Ingredients | Resin Solids | Pigment Solids | Parts by Weight (grams) |
|---|---|---|---|
| Aqueous dispersion of Example 1C | 635.9 | — | 1879 |
| Crater control agent[1] | 68.4 | — | 193.2 |
| Pigment paste[2] | 63.1 | 157.1 | 1351.0 |

[1]Jeffamine-epoxy adduct as disclosed in U.S. Pat. No. 4,432,850.
[2]The pigment paste was prepared by grinding the following to a Hegman Scale of 7+, in a sand mill.

| Ingredients | Solids | Parts by Weight (grams) |
|---|---|---|
| Deionized water | — | 37 |
| Titanium dioxide | 378 | 378 |
| Clay | 118 | 118 |
| Lead Silicate | 49 | 49 |
| Carbon black | 10 | 10 |
| Dibutyltin oxide | 33 | 33 |
| SURFONYL 104E | — | 3 |
| Grinding Resin[3] | 237 | 775 |

[3]The grinding vehicle is essentially the same as disclosed in commonly assigned U.S. Pat. application Ser. No. 880,379.

Example 1E

The paint having a pH of 6.31, bath conductivity of 1400 micro mhos per centimeter was electrocoated on steel substrates as follows.

At a bath temperature of 84° F., panels of steel substrate were electrocoated at a potential of 275 volts for 120 seconds. There were obtained films of 0.96 thickness at a throw power of 11⅞. The films were baked at 170° C. for about 30 minutes to produce hard and durable coatings. The performance data for this and other coatings of these inventions are shown in the table hereinafter.

Example 2

This example illustrates the novel blocked isocyanate curing agent of the present invention wherein the blocking agent was acetone oxime.

| Ingredients | Parts by Weight | Equivalents | Solids |
|---|---|---|---|
| Meta-xylylene diisocyanate | 1018 | 10.83 | 1018 |
| Methylisobutyl ketone | 710 | — | — |
| Acetone oxime | 396 | 5.42 | 396 |
| Dibutyltin dilaurate | 0.96 | 0.04% | — |
| Trimethylolpropane | 242 | 5.42 | 242 |

The meta-xylylene diisocyanate and methylisobutyl ketone were charged to a 5-liter flask equipped with a nitrogen blanket, condenser, stirrer and a thermometer. The resultant mixture was heated to 60° C. Thereafter, the acetone oxime was added to the mixture over a period of about 1½ hours while applying cooling to keep the reaction mixture at 68° C. or lower. The reaction mixture was held for one hour at 60° C. Isocyanate equivalent of the reaction mixture was 388. Thereafter, the trimethylolpropane was added in two equal batches as follows. At 60° C., dibutyltin dilaurate and batch-one of trimethylolpropane was added with a resulting exotherm to 93° C. followed by cooling to 65° C. The reaction mixture was held for 30 minutes at 65° C. Batch-two of TMP was then added with a resulting exotherm to 96° C., followed by cooling to 65° C. The resultant mixture was held at 65° C. for about 3½ hours until virtually all of the isocyanates had reacted.

An aqueous dispersion of the resinous composition and the crosslinker were prepared as follows:

| Ingredients | Parts by Weight (grams) |
|---|---|
| Resin of Example 1A | 825 |
| Lactic acid | 61 |
| Surfactant (as in Example 1C) | 21 |
| Crosslinker of Example 2 | 794 |
| Deionized water | 706 |
| Deionized water | 534 |
| Deionized water | 841 |

The resin of Example 1A was added to a mixture of lactic acid, the surfactant, the crosslinker and 706 grams of water and blended. The resultant dispersion having a solids content of 55 percent was reduced in solids content to 45 and 35 percent solids by addition of the remaining parts by weight of water. The resultant aqueous dispersion was then vacuum stripped of solvent, and deionized water was added back to yield a dispersion of 30.3 percent solids.

Example 3

This example illustrates the novel blocked isocyanate curing agent of the present invention wherein the blocking agent was diethyl ketoxime.

| Ingredients | Parts by Weight (grams) |
|---|---|
| Meta-xylylene diisocyanate | 940 |
| Methylisobutyl ketone | 733 |
| Diethyl ketoxime | 546 |
| Dibutyltin dilaurate | 0.97 |
| Trimethylolpropane | 224 |

The meta-xylylene diisocyanate, methylisobutyl ketone and tin catalyst were charged to a 5-liter flask equipped with a nitrogen blanket, condenser, stirrer and a thermometer. The mixture was heated to 40° C. Thereafter the diethyl ketoxime was added to the mixture over a period of about 2½ hours while applying cooling to deep the reaction mixture between about 45° C. and 55° C. The reaction mixture was then stirred for about one hour at 55° C. Isocyanate equivalent of the reaction mixture was 525. Thereafter, the trimethylolpropane was added in two equal batches as follows. At 55° C., batch-one was added with a resulting exotherm to 83° C. and the reaction temperature being maintained with cooling at 69° C. Batch-two was added with a resulting exotherm to 94° C. and then heat was applied to establish 100° C. The resultant mixture was held at 100° C. for two hours. The final product has a viscosity Y+. Analysis: Infrared analysis shows no —NCO present.

An aqueous dispersion of the resinous composition and the crosslinker were comprising MXDI blocked with diethyl ketoxime was Prepared in essentially the same manner as described in Example 1C.

| Ingredients | Parts by Weight (grams) |
|---|---|
| Resin of Example 1A | 825 |
| Lactic acid | 61.0 |
| Surfactant (as in Example 1C) | 21.0 |
| Crosslinker | 794.0 |
| Deionized water | 706 |
| Deionized water | 534 |
| Deionized water | 841 |

A resin essentially the same as described in Example 1A was added to a mixture of lactic acid, the surfactant, the crosslinker and 706 grams of water and blended. The resultant dispersion having a solids content of 55 percent was reduced in solids content to 45 and 35 percent solids by addition of the remaining parts by weight of water. The resultant aqueous dispersion was then vacuum stripped of solvent and deionized water was added back to yield a dispersion of 38.5 percent solids.

Example 4

This example illustrates the novel blocked isocyanate curing agent of the present invention, wherein the blocking agent is methylpropyl ketoxime.

| Ingredients | Parts by Weight (grams) |
|---|---|
| Meta-xylylene diisocyanate | 940 |
| Methylisobutyl ketone | 733 |
| Methylpropyl ketoxime | 546 |
| Dibutyltin dilaurate | 0.97 |
| Trimethylolpropane | 224 |

The meta-xylylene diisocyanate, methylisobutyl ketone and dibutyltin dilaurate were charged to a 5 liter flask equipped with a nitrogen blanket, condenser, stirrer and a thermometer. The resultant mixture was heated to 40° C. The methylpropyl ketoxime was added to the mixture over a period of about 4½ hours while applying cooling to keep the reaction mixture at 55° C. or lower. The reaction mixture was held for about one hour at 55° C. Isocyanate equivalent weight of the reaction mixture was 465.

Thereafter, the trimethylolpropane was added in two equal batches as follows. At 55° C., batch-one was added with a resulting exotherm to 90° C. The reaction temperature was then maintained with cooling at 67° C. The reaction mixture was held for about 30 minutes at about 70° C. At 67° C., batch-two was added with a resulting exotherm to 90° C. and then a hold temperature of 100° C. was established with heating. The resultant mixture was held at 100° C. for two hours. The final product has a viscosity Z—. Analysis: Infrared analysis shows no —NCO present.

Example 5

This example illustrates the novel blocked isocyanate curing agent of the present invention, wherein the blocking agent is methylisopropyl ketoxime.

| Ingredients | Parts by Weight (grams) |
|---|---|
| Meta-xylylene diisocyanate | 940 |
| Methylisopropyl ketoxime | 546 |
| Trimethylolpropane | 224 |
| Dibutyltin dilaurate | 0.97 |
| Methylisobutyl ketone | 733 |

The meta-xylylene diisocyanate, methylisobutyl ketone, and dibutyltin dilaurate were charged to a 5-liter flask equipped with a nitrogen blanket, condenser, stirrer, and a thermometer. The resultant mixture was heated to 40° C. The methylisopropyl ketoxime was added to the mixture over a period of 3½ hours while applying cooling to keep the reaction mixture at 40° C. to 50° C. The reaction mixture was then held at 55° C. for one hour. The isocyanate equivalent weight of the mixture was 544.

Thereafter, the trimethylolpropane was added in two equal batches as follows. At 55° C., batch-one was added with a resulting exotherm to 87° C. The reaction temperature was then reestablished at 69° C. after a total of one-half hour. The second batch of trimethylolpropane was then added and a hold temperature of 100° C. was established with heating. The mixture was held at 100° C. for two hours at which time infrared analysis revealed no —NCO left. Viscosity of the product was Z−2.

An aqueous dispersion of the resinous composition and the crosslinker above was then prepared in essentially the same manner as in Example 1C. An electrocoatable paint was then prepared in essentially the same manner as Example 1D.

Comparative Data

The coating compositions of the present invention comprising the aqueous dispersions as described herein were electrocoated on conductive substrates, topcoated, baked and evaluated, and compared with aqueous dispersions containing art-related blocked isocyanates, as shown in the table below.

The comparative compositions are designated in the table below as Examples C-1 through C-16. In the examples, the meta-xylylene diisocyanate was chain extended with trimethylolpropane and blocked with various blocking agents, as listed in the table.

In Examples C-8 through C-10, isophorone diisocyanate (IPDI) was similarly chain extended with trimethylolpropane and blocked with similar blocking agents, as listed in the table.

In Examples C-11 through C-16, yet, other isocyanates were similarly chain extended and blocked. The isocyanates were crude diphenylmethane diisocyanate (crude MDI), trimethylhexamethylne diisocyanate (TMDI), dicyclohexylmethane diisocyanate (Des W), toluene diisocyanate (TDI), diphenylmethane diisocyanate (MDI). The methods of preparing and using the above blocked isocyanates and cationic paints containing the same were essentially the same as described in Example 1A. Accordingly, 825 parts by weight (grams) of resin of Example 1A was added to 61 parts by weight (grams) of lactic acid, and mixed with 21 parts by weight (grams) of surfactant, 794 parts by weight of the respective blocked isocyanate curing agent and sufficient water to produce an aqueous dispersion.

The aqueous dispersion containing the comparative blocked isocyanates were formulated into a cationic paint and electrocoated under essentially the same conditions as disclosed in Example 1E. The electrocoated (primed) substrates were then top coated with compatible lacquers, powders, or color plus clear coatings and then evaluated. The following is a tabular depiction of the examples. The table is better read with reference to the following:

The blank spaces therein denote instances where the properties in question were not measurable.

Parenthesis in the CORROSION RESISTANCE column shows a direct juxtaposition of corrosion test results of the "control panels" with those of the test panels. The "control panels" here and throughout the table were primed with UNIPRIME (a cationic electrodepositable composition available from PPG Industries, Inc.), which is widely used in the industry. The control and test panels were cut out from the same large panel and run side by side in the same spray rack during topcoating. In evaluating corrosion resistance, there was adopted a rating system with "10" indicating no scribe creepage due to corrosion and "0" indicating total loss of film due to corrosion.

(1) "Color Change ΔE" was an ASTM D-2244-79 measurement of color difference of primed (test panel) versus unprimed area (reference control panel) with a uniform topcoat (white in color). Color change in the topcoat over the primed area of the panel was observed. In column 1(a), lacquer topcoat WALD 3967 was employed. In column 1(b), a powder topcoat derived from a powder coating derived from about 77% epoxy functional acrylic polymer (40% glycidyl methacrylate, 40% methylmethacrylate, 10% butyl acrylate, 10% styrene), 23% polyol-modified polyanhydride, and other coating additives as disclosed in U.S. Pat. Ser. No. 74,105 was employed.

(2) DOI (distinctness of image) was measured with a Dori-Gon Meter D47-6 manufactured by Hunter Laboratories; in Column 2(a), the color (basecoat) and clear (topcoat) were respectively UBC 8554 and DCT 3000. In Column 2(b), the base coat was essentially the same as disclosed in U.S. Pat. No. 4,650,718 and the clear coat was a powder coating derived from about 77% on epoxy function acrylic polymer (40% glycidyl methacrylate, 40% methylmethacrylate, 10% butyl acrylate, 10% styrene), 23% polyol-modified polyanhydride, and other coating additives as disclosed in U.S. Pat. Ser. No. 74,105.

(3)
 (a) Salt spray corrosion resistance was measured by scribing the cured coated panels with an "X" and exposing the scribed panels to a salt spray fog at 100° F. (38° C.) as generally described in ASTM B-117 for 500 and 1,000 hours. The panels were removed from the chamber, dried, the scribe mark taped with masking tape, the tape pulled off at a 45° angle and the creepage from the scribe mark measured. Creepage is the rusted darkened area of the panel where the coating has lifted from the panel surface. The reported data in the table is in milimeters (mm) of scribe creepage.
 (b) Scab corrosion (a blister-like lifting of film) was a measure of loss of paint adhesion and corrosion of the coated base metal which results in the distortion or upheaval of the paint film exposed to warm and humid weather conditions. It was measured by General Motors Corporation, Fisher Body Division Test Method, referenced specification GM 4298P Salt Spray Testing and GM 9102P Corrosion Creepage Testing, generally described as follows. Under conditions of 140° F. and relative humidity of 80 to 90% in a daily cycle, the test panels are dipped in a 5% salt solution for about 15 to 20 minutes, air-dried at ambient for about 75 minutes, and then returned to a humidity cabinet. Once every seven cycles, the panels are placed in a 140° F. hot room for about one hour, removed and placed in a −10° F. to 0° F. freezer for about 30 minutes, dipped in a 5% salt solution for about 15 to 20 minutes, air-dried at ambient for about 75 minutes and then returned to the humidity cabinet. After the prescribed number of cycles, usually 20, the panels are blown off with high-pressure air which removes all loosely adhering paint. The panels are then rated on a scale from 0 to 10 as described above.

TABLE

| Example | CURING AGENT Isocyanates | Blocking Agents | BATH CONDITIONS pH | Conductivity | Bath Temperatures | Film Build (mils) | Throw Power (Inches) |
|---|---|---|---|---|---|---|---|
| 1 | MXDI | Methylethyl ketoxime | 6.26 | 2190 | 92° F. | 1.14 | 11¼ |
| 2 | " | acetone oxime | 6.59 | 3300 | 94° F. | 0.99 | 12¼ |
| 3 | " | Diethyl ketoxime | 6.51 | 2560 | 92° F. | 0.92 | 11¾ |
| 4 | " | Methylpropyl ketoxime | 6.41 | 2360 | 89° F. | 0.93 | 11¼ |
| 5 | " | Methylisopropyl ketoxime | 6.28 | 2390 | 87° F. | 0.56 | 11½ |
| C-1 | " | Methylisobutyl ketoxime | 6.25 | 2275 | 91° F. | 0.89 | 11¼ |
| C-2 | " | Diisobutyl ketoxime | 6.33 | 2360 | 95° F. | 0.88 | 11½ |
| C-3 | " | Ethyl Carbitol | 6.44 | 2650 | 87° F. | 0.99 | 12¼ |
| C-4 | " | Hexyl cellosolve | 6.30 | 2225 | 79° F. | 0.86 | — |
| C-5 | " | 2-Ethyl hexanol | 6.26 | 2225 | unstable paint | — | — |
| C-6 | " | Dibutyl glycolamide | 6.36 | 2530 | 93° F. | 0.97 | 12⅛ |
| C-7 | " | E-Capro Lactam | 6.30 | 2275 | 95° F. | 0.52 | 13 |
| C-8 | IPDI | Methylethyl ketoxime | 6.35 | 2410 | 95° F. | 0.47 | 13½ |
| C-9 | " | Methylamyl ketoxime | 6.23 | 2430 | 95° F. | 0.35 | 12⅞ |
| C-10 | " | Butyl Carbitol | 6.42 | 2710 | 74° F. | 1.07 | 11¾ |
| C-11 | Crude MDI | Butyl Carbitol | 6.32 | 1580 | 88° F. | 0.85 | 11¾ |
| C-12 | TMXDI | Methylethyl ketoxime | 5.98 | 2475 | 95° F. | 0.46 | 12½ |
| C-13 | TMDI | Methylethyl ketoxime | 6.24 | 2450 | 80° F. | 0.93 | 11½ |
| C-14 | Des W | Methylethyl ketoxime | 6.27 | 2375 | 88° F. | 1.5 | 8½ |
| C-15 | TDI | Hexyl cellosolve | 6.32 | 2325 | 92° F. | 0.55 | 12¼ |
| C-16 | MDI | C-11 oxime | 6.26 | 2830 | 95° F. | 0.44 | 17 |

| Example | COLOR CHANGE E[1] White(a) Lacquer Topcoat | Powder(b) Clear Topcoat | DOI[2a] Color/ Clear | DOI[2b] Clear/ Color | CORROSION RESISTANCE[3] 14-Day Salt Spray Zinc Phosphated Steel (mm) | Cold Rolled Steel (mm) | SCAB CORROSION Zinc Phos. Steel | Cold Rolled Steel |
|---|---|---|---|---|---|---|---|---|
| 1 | 1.09 | 0.39 | 95.3 | 83.4 | 0 | 2 | 6(7) | 3(3) |
| 2 | 1.06 | 0.29 | 93.8 | 85.4 | 0 | 3 | 7(7) | 4(3) |
| 3 | 0.87 | 0.29 | 96.2 | 83.3 | 1 | 3 | 5(6) | 2(4) |
| 4 | 0.58 | 0.36 | 96.1 | 88.0 | 1 | 1-2 | 6(7) | 2(4) |
| 5 | 1.02 | 0.10 | 95.1 | 87.0 | 1 | 4 | 6(7) | 1(4) |
| C-1 | 1.21 | 0.28 | 96.4 | 83.8 | 0 | 3 | 5(6) | 2(3) |
| C-2 | 1.62 | 0.26 | 93.9 | 82.6 | 1 | 1-2 | 7(7) | 2(4) |
| C-3 | 0.94 | 0.32 | 93.7 | 87.3 | 0 | 5 | 5(6) | 2(4) |
| C-4 | 2.17 | 0.32 | 95.9 | 83.8 | 0 | 5 | 6(6) | 2(3) |
| C-5 | — | — | — | — | — | — | — | — |
| C-6 | 0.83 | 0.22 | 93.3 | 79.8 | 0 | 4 | 7(7) | 3(3+) |
| C-7 | 1.94 | 0.14 | 96.3 | 85.4 | 1 | 3 | 5(6) | 3(4) |
| C-8 | 0.91 | 0.28 | 90.7 | 84.7 | 1 | 1-3 | 4(7) | 0(4) |
| C-9 | 2.60 | 0.21 | 92.3 | 89.0 | 1 | 3 | 5(7) | 0(4) |
| C-10 | 0.61 | 0.24 | 94.9 | 77.5 | 0 | 3 | 6(7) | 1(4) |
| C-11 | 5.48 | 0.34 | 95.7 | 84.5 | 0 | 5 | 7(7) | 2(4) |
| C-12 | 0.89 | 0.10 | 81.1 | 79.8 | 4 | 2-3 | 6(7) | 2(4) |
| C-13 | 0.58 | 0.12 | 92.9 | 83.8 | 0 | 4 | 4(6) | 2(4) |
| C-14 | 1.48 | 0.34 | 39.5 | 76.5 | 1 | 2 | 5(4) | 0(7) |
| C-15 | 8.19 | 1.40 | 92.8 | 90.8 | 1 | 1-4 | 6(7) | 2(4) |
| C-16 | 5.48 | 0.15 | 84.4 | 85.9 | 1 | 1-2 | 6(7) | 2(4) |
| UNIPRIME | 8.34 | 3.78 | 96.0 | 88.1 | 1 | 4 | | |

The unique feature of the preferred embodiment of this invention as shown in Example 1A resides in the combination of non-yellowing, corrosion resistance, as well as good appearance manifested in good distinctness of image (DOI) which is obtained at a low temperature bake (340° F.). In comparison, as shown in Example C-15 (toluene diisocyanates), aromatic isocyanates are characterized by good corrosion resistance over a variety of substrates but show severe yellowing. In all, the claimed invention encompasses the select group of blocked isocyanates described herein.

Therefore, What is claimed is:

1. A process for reducing color shift in a coating comprising a blocked isocyanate curing agent, comprising:
    (1) applying to a substrate a coating composition comprising:
        (a) an active hydrogen-containing material, and
        (b) a curing agent which is a reaction product of
            (i) meta-xylene diisocyanate or a prepolymer thereof;
            (ii) a ketoxime containing from three to five carbon atoms;
        wherein the equivalent ration of the blocked isocyanate to the active hydrogen-containing material is from about 0.30: to 1:1;
    (2) heating the applied coating to a temperature sufficient to effect cure.

2. The process of claim 1, wherein the curing agent is methylethyl ketoxime.

3. The process of claim 1, wherein the prepolymer is trimethylopropane, trimethylol ethane of polycaprolactone triol.

4. The process of claim 1, wherein the equivalent ration of the —OH of the ketoxime to the —NCO of the isocyanate is about 0.3 to 1:1.

5. The process of claim 1 wherein the coating composition is applied by electrodeposition.

6. An improved process for reducing color shift in multiple coatings containing a blocked isocyanate curing agent comprising: applying a basecoat followed by applying a topcoat and curing the applied coating to an effective temperature; the improvement comprising the blocked isocyanate which is a reaction product of:
(i) meta-xylylene diisocyanate or a prepolymer thereof;
(ii) a ketoxime containing from three to five carbon atoms.

7. The process of claim 6 wherein the topcoat is a colored or clear coating.
8. The process of claim 7 wherein the colored coating is a pastel coating.
9. The process of claim 6 wherein the topcoat is a lacquer or a powder coating.

* * * * *

UNITED STATES PATENT AND TRADEMARK OFFICE
CERTIFICATE OF CORRECTION

PATENT NO. : 4,846,946

DATED : July 11, 1989

INVENTOR(S) : George W. Mauer et al

It is certified that error appears in the above-identified patent and that said Letters Patent is hereby corrected as shown below:

In claim 1 (column 16, line 50), the spelling of "ratio" is incorrect. Please delete "ration" and replace with --ratio--.

In claim 3 (column 16, line 58), the spelling of "trimethylolpropane" is incorrect. Please delete "trimethylopropane" and replace with --trimethylolpropane--.

In claim 4 (column 16, line 61), the spelling of "ratio" is incorrect. Please delete "ration" and replace with --ratio--.

Signed and Sealed this

Twenty-third Day of October, 1990

*Attest:*

HARRY F. MANBECK, JR.

*Attesting Officer*      *Commissioner of Patents and Trademarks*